United States Patent
Koneda et al.

(10) Patent No.: US 6,585,066 B1
(45) Date of Patent: Jul. 1, 2003

(54) MOTOR/ALTERNATOR WITH INTEGRAL WET CLUTCH FOR USE IN HYBRID VEHICLES

(75) Inventors: Philip Thomas Koneda, Novi, MI (US); Stephen John Agdorny, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/567,363

(22) Filed: May 9, 2000

(51) Int. Cl.[7] ................................................ B60K 6/00
(52) U.S. Cl. .................... 180/65.2; 180/65.3; 180/54.1; 180/165
(58) Field of Search .............................. 180/65.2, 165, 180/65.3, 54.1

(56) References Cited

U.S. PATENT DOCUMENTS

| | | |
|---|---|---|
| 4,938,097 A | 7/1990 | Pierce |
| 5,383,825 A | 1/1995 | El-Khoury et al. |
| 5,389,046 A | 2/1995 | Timte et al. |
| 5,514,047 A | 5/1996 | Tibbles et al. |

*Primary Examiner*—Paul N. Dickson
*Assistant Examiner*—Deanna Draper
(74) *Attorney, Agent, or Firm*—Brooks & Kushman, P.C.; F. G. McKenzie

(57) ABSTRACT

A hybrid driveline for an automotive vehicle comprising an internal combustion engine and a power transmission mechanism for transferring torque to the traction wheels of the vehicle. An electric starter motor/alternator unit is situated between the torque input element of the automatic transmission and the crankshaft of the engine. A wet clutch disc assembly receives torque from the engine through a damper assembly. The torque output side of the clutch is connected to the rotor of the motor/alternator unit, which in turn is connected driveably to the torque input shaft of the transmission. The damper attenuates peak torque fluctuations of the internal combustion engine, thereby reducing the maximum torque transmitting requirements of the clutch. The damper and the clutch are arranged in a compact assembly within the stator and rotor of the motor/alternator unit.

10 Claims, 3 Drawing Sheets

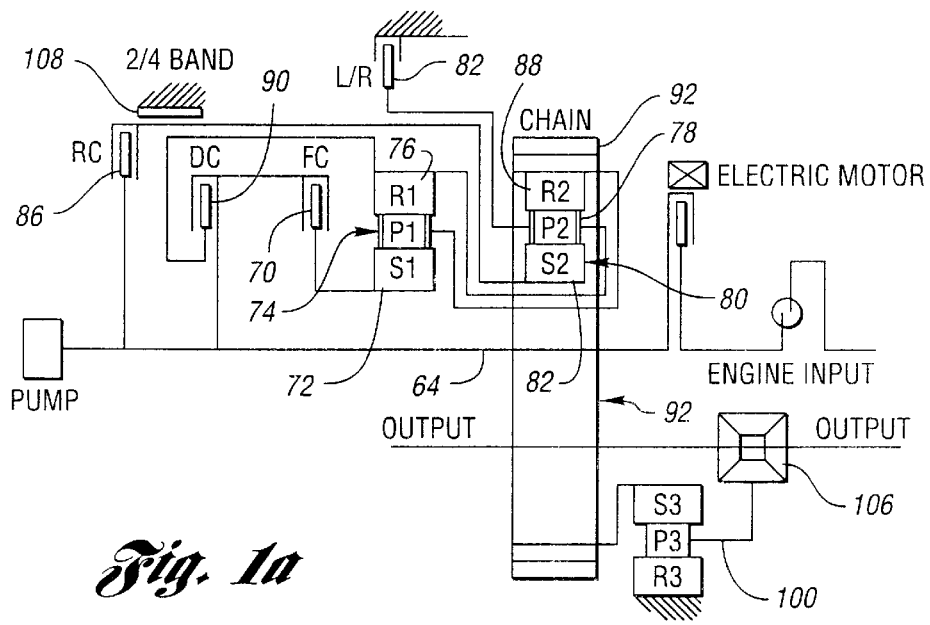
*Fig. 1a*
| FRICTION ELEMENT APPLICATION |||||||
| GEAR | RC | FC | DC | L/R | 2/4 | RATIO |
| --- | --- | --- | --- | --- | --- | --- |
| 1ST |  | X |  | X |  | 1ST |
| 2ND |  | X |  |  | X | 2ND |
| 3RD |  | X | X |  |  | 3RD |
| 4TH |  |  | X |  | X | 4TH |
| REV | X |  |  | X |  | 2.310 |
X = ELEMENT TRANSMITS TORQUE
*Fig. 1b*
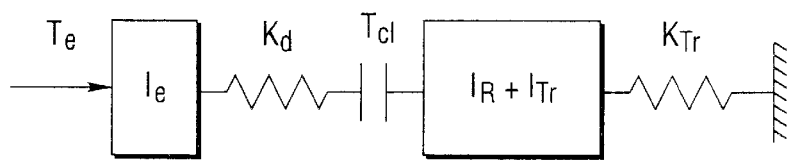
*Fig. 1c*

MOTOR/ALTERNATOR WITH INTEGRAL WET CLUTCH FOR USE IN HYBRID VEHICLES

TECHNICAL FIELD

The invention relates to hybrid vehicle powertrains, including an internal combustion engine and an electric motor, wherein driving torque of the engine is supplemented with motor torque.

BACKGROUND ART

It is possible to reduce power losses inherent in a powertrain for motor vehicles by supplementing driving torque developed by an internal combustion engine with electric motor torque. A hybrid vehicle driveline of this kind is described, for example, in copending U.S. patent application Ser. No. 09/353,290, filed Jul. 15, 1999, entitled "TRANSMISSION AND CONTROL SYSTEM FOR USE WITH AN ENGINE IN A HYBRID ELECTRIC VEHICLE." The copending application is assigned to the assignee of the present invention.

The powertrain of the copending application combines the advantages of an internal combustion engine with the advantages of an electric motor drive, thereby improving fuel economy and reducing undesirable exhaust gas emissions from the internal combustion engine.

The internal combustion engine can be deactivated when the vehicle is at rest. The induction motor can be used to complement the engine torque to provide added launch performance. During vehicle coast-down, regenerative braking is achieved, thereby further improving fuel economy.

The electric motor of a hybrid powertrain replaces the hydrokinetic torque converter included in most contemporary multiple-ratio automatic transmissions for automotive vehicles. A torque converter provides added torque for acceleration, but it also functions as a fluid coupling to attenuate engine torque variations during acceleration as well as during steady-state operation. Because of the absence of a torque converter in a hybrid powertrain, there is a need to effect by other means the necessary driving torque management and attenuation of inertia forces in the powertrain.

DISCLOSURE OF INVENTION

The improved powertrain of the invention makes it possible to achieve driving torque management and inertia force control in a hybrid powertrain. It includes a power flow path developed by an electric motor (i.e., a starter motor/alternator unit) packaged in parallel disposition with respect to a conventional internal combustion engine. The parallel power flow path will allow the internal combustion engine to be disconnected from the driveline when the vehicle stops or coasts. When the vehicle operates under low-power driving conditions, the power flow path for the motor may be used exclusively.

Energy may be recovered during coasting with the vehicle in a coast-braking mode. During heavy throttle acceleration, the added torque available from the motor can augment the torque of the internal combustion engine.

The improved hybrid powertrain of the invention includes a motor/alternator unit with an integral wet clutch. A torsional spring damper is located on the torque output side of the engine and on the torque input side of the wet clutch. The torque output side of the wet clutch is connected to the rotor of the electric motor/alternator unit, which results in reduced clutch gain and improves engagement quality of the clutch during transitions into and out of the electric motor drive mode.

The torque input side of the damper is connected to the engine crankshaft. It replaces the usual engine drive plate and starter ring gear assembly.

The clutch comprises a clutch cylinder that supports the rotor of the electric motor. The motor rotor and the clutch cylinder are rotatably supported on a stationary housing bearing support. Since the stator of the motor and the rotor are both piloted on the same stationary bearing support, accurate control of an electric motor air gap between the motor stator and the motor rotor can be maintained.

When the clutch is released, the motor can provide power directly to the input shaft of the transmission. When the clutch is engaged, the internal combustion engine is connected to the transmission input shaft, thereby enabling the motor to act as a starter motor for the engine. Engine vibrations are isolated by the torsional spring damper.

The electric motor rotor functions as an engine flywheel, thereby smoothing driveline disturbances.

The clutch friction elements are lubricated and cooled by transmission oil provided by a dedicated lubrication line. That oil is used further to cool the electric motor, which surrounds the clutch.

BRIEF DESCRIPTION OF DRAWINGS

FIG. 1a is a schematic line diagram of the torque-transmitting elements of the transmission of FIG. 1;

FIG. 1b is a chart showing the pattern of engagement and release of the clutches and brakes of the transmission of FIG. 1 during changes in ratio during forward drive and during reverse drive;

FIG. 1c is a schematic diagram showing the rotational dynamics of the powertrain of FIG. 1 with the starter/alternator damper located between the crankshaft and the rotor of the starter/alternator unit;

PARTICULAR DESCRIPTION OF THE INVENTION

Figure 1:
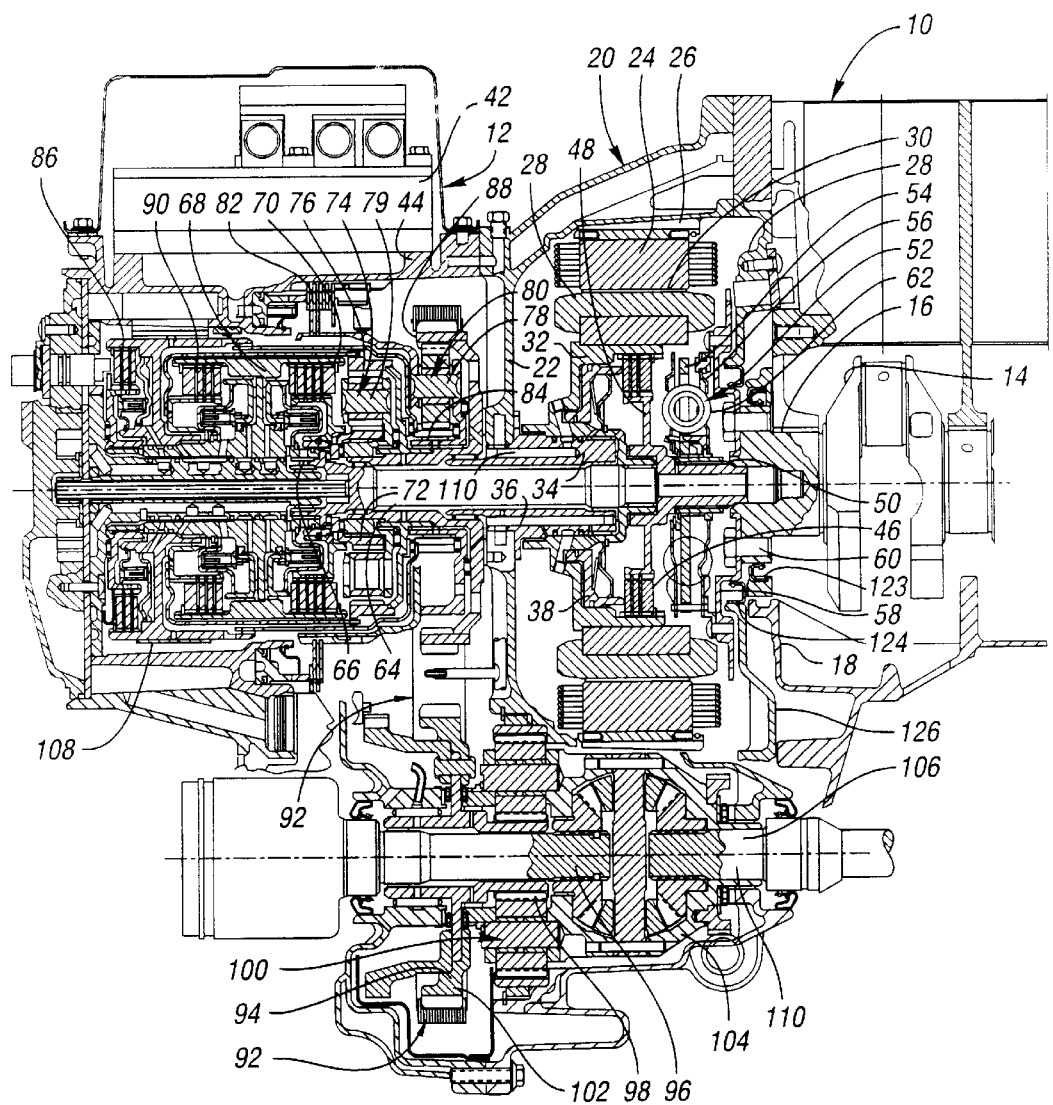
FIG. 1 is a cross-sectional assembly view of a multiple-ratio transmission and starter/alternator unit, the latter being situated between a transmission and the crankshaft of an internal combustion engine.

In FIG. 1, reference numeral 10 designates schematically an internal combustion engine for an automotive vehicle. Numeral 12 designates generally a multiple-ratio automatic transmission.

The engine 10 includes a crankshaft 14 journalled at 16 in end wall 18 of the engine housing. An intermediate housing 20 is located between the end wall 18 of the engine 10 and wall 22 for the transmission 12.

The intermediate housing encloses a stator 24 of an electric motor. The stator and the stator windings are secured to an interior machined surface 26 of the housing 20. A rotor assembly 28 is situated within the stator and separated from the stator by an air gap designated by numeral 30.

A wet clutch cylinder 32 is secured to the rotor assembly 28. A support bearing shaft 34 rotatably supports the clutch cylinder 32 and is secured by bolts 36, or by other suitable fastening techniques, to the transmission wall 22.

An annular piston 38 is situated within the clutch cylinder 32 and cooperates with the cylinder to define a pressure chamber in communication with fluid pressure passage 40 in the support shaft 34. Passage 40 communicates with a passage structure extending to a control valve body, shown generally at 42, which is secured to the upper side of transmission housing 44.

A wet clutch disc assembly 46 has clutch plates secured to the cylinder 32. Internally splined clutch discs are carried by clutch element 48, which in turn is connected, preferably by drive splines, to the hub 50 of a spring damper assembly 52. A damper drive plate 54 is connected directly to the hub 50. Damper housing 56 is connected directly to crankshaft drive plate 58. The hub of drive plate 58 is secured directly, preferably by bolts 60, to the end of crankshaft 14.

Damper springs 62 are situated between the damper drive plate 54 and the damper housing 56. They are arranged in a circular fashion about the axis of the hub 50, thereby providing a resilient connection between the crankshaft and the clutch element 48 in known fashion.

The torque input shaft for the transmission is shown at 64. Although the transmission illustrated in FIG. 1 can be used in the hybrid powertrain of the invention, other gearing arrangements also can be used to provide forward driving torque flow paths and a reverse ratio. The gearing arrangement for the embodiment of FIG. 1 is similar to the gearing arrangement illustrated in U.S. Pat. No. 4,938,097 (S. L. Pierce), which is assigned to the assignee of the present invention.

Torque input shaft 64 is connected through a drive spline 66 to clutch cylinder 68 for forward drive friction clutch 70. When clutch 70 is engaged, a driving connection is established between shaft 64 and sun gear 72 of a first planetary gear unit 74. A ring gear 76 is connected driveably to carrier 78 of gear unit 80. Carrier 78 is adapted to be braked by selectively engageable low-and-reverse brake 82.

A sun gear 84 is connected driveably to the transmission torque input shaft 64 through a reverse clutch 86. The ring gear 88 of the gear unit 80 is driveably connected to the carrier 79 for the gear unit 74.

A direct-drive clutch assembly 90 connects the torque input shaft 64 with the clutch cylinder 68. Clutch cylinder 68 also is connected to the sun gear 72 through the clutch 70, as mentioned earlier. Clutch 90 also connects the shaft 64 to the ring gear 76.

The ring gear 88 of gear unit 80 defines a sprocket for a chain drive, indicated generally at 92. The driven sprocket of the chain drive, shown at 94, is rotatably mounted in the transmission housing on the axis of torque output shaft 96. It is connected driveably to a sun gear 98 of final drive gearset 100. The ring gear 102 of the final drive gearset 100 is connected directly to the transmission housing.

The carrier of the gearset 100 is connected to differential carrier 104 of a differential gear unit 106. Differential pinions are carried by the carrier 104. They mesh driveably with side gears carried by torque output shaft 96 and a companion output shaft 110. Each output shaft is connected to vehicle traction wheels through a universal joint assembly and axle half-shafts, not shown.

A friction brake band 108 surrounds a brake drum that forms a part of the reverse clutch 86. The brake drum is connected driveably to sun gear 84 of gear unit 80.

For a complete description of the gearing and the clutches and brakes of the transmission 12, reference may be made to the previously mentioned Patent U.S. Pat. No. 4,938,097. That description is incorporated in this disclosure by reference.

FIG. 1b shows a clutch and brake engagement and release sequence to establish four forward-driving ratios and a single reverse ratio. The clutches and brakes are identified in FIG. 1b by the symbols RC, FC, DC, L/R and 2/4, which indicate, respectively, the reverse clutch 86, the forward clutch 70, the direct clutch 90, the low-and-reverse brake 82 and the brake band 108. The symbols R, S and P (with appropriate subscripts) identify the ring gears, the sun gears and the planetary pinion carriers, respectively.

To establish the first gear ratio in the forward-drive range, the forward clutch FC and the low-and-reverse brake L/R are engaged. The forward clutch remains applied for operation in each of the first three forward-driving ratios.

A ratio change to the second forward-driving ratio is obtained by applying brake band 2/4. An upshift to the third ratio is achieved by releasing brake band 2/4 and applying clutch DC. Fourth ratio, which is the top forward-drive ratio, is achieved by releasing the forward clutch FC and applying reaction brake 2/4.

Reverse drive is obtained by simultaneously applying reverse clutch RC and low-and-reverse brake L/R.

FIG. 1c is a schematic representation of the rotational dynamics of the engine, transmission and motor system of FIG. 1. The torque of the engine is represented as $T_e$. The inertia of the engine is represented by the symbol $I_e$. The spring damper 52 has a damper stiffness $K_d$, which affects the input torque for the wet clutch $T_{cl}$, shown as 46 in FIG. 1. The output side of the clutch $T_{cl}$ drives the inertia of the rotor 28 ($I_r$) and the inertia of the rotary elements of the transmission ($I_{rr}$). The equivalent spring constant for the transmission elements located between the electric motor rotor and the torque output shaft of the transmission is represented by the symbol $K_{tr}$. The spring damper is in series relationship with respect to the engine torque, the inertia forces for the motor and rotary transmission elements.

Figure 2:
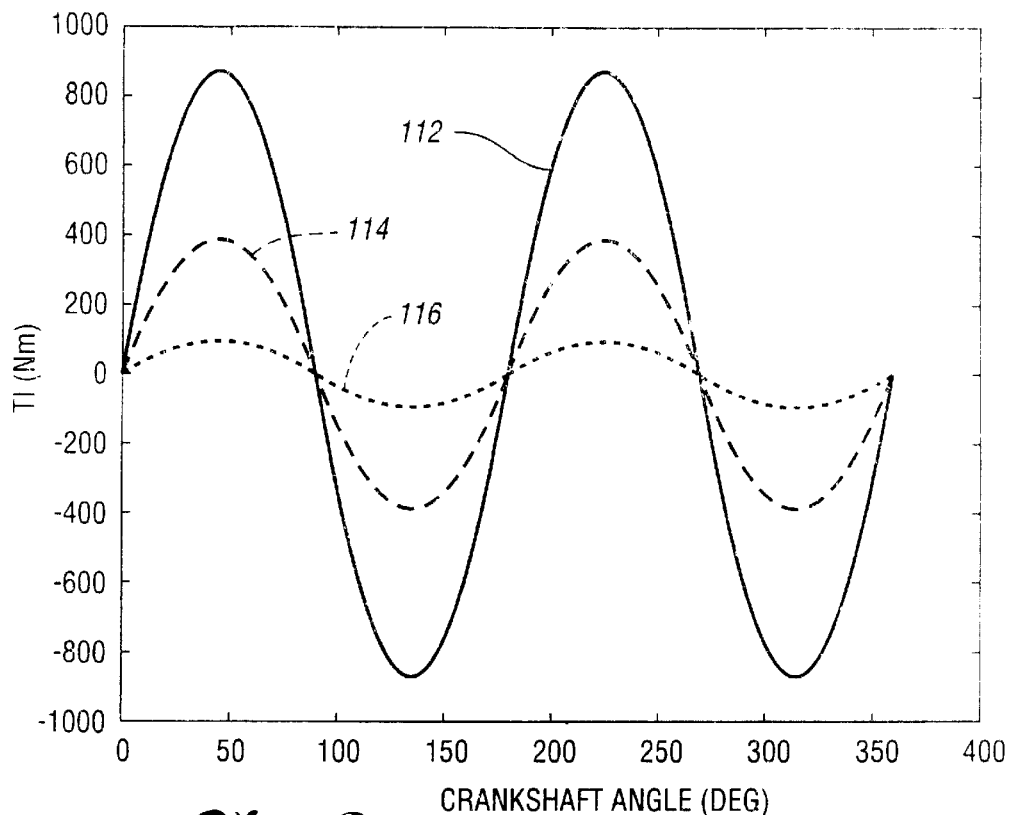
FIG. 2 is a chart showing variations of the inertia torque for the engine, illustrated in FIG. 1, verses the crankshaft angle.

FIG. 2 demonstrates that the fundamental frequency of the engine torque will result in an inertia torque, which is plotted against crankshaft angle at various engine speeds. Of course, the inertia torque is much higher at high speeds than at lower speeds. The inertia torque fluctuations at 6000 engine rpm is plotted at 112. The corresponding inertia torques at engine speeds of 4000 rpm and 2000 rpm are shown, respectively, at 114 and 116.

Figure 3:
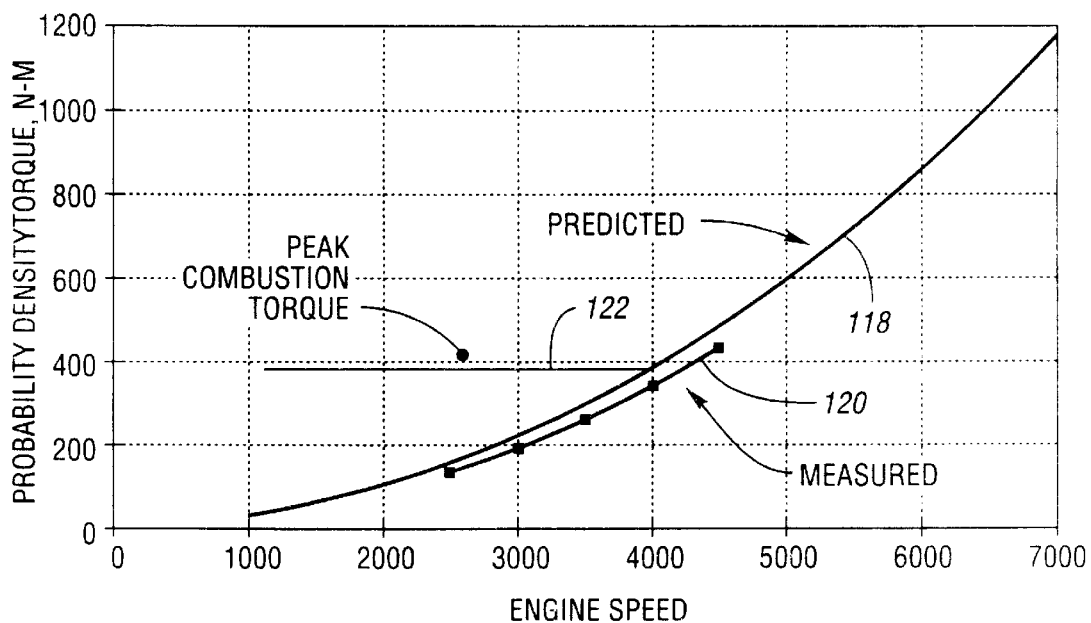
FIG. 3 is a plot of inertial engine torque verses engine speed.

The peak engine torque is the dominant torque affecting the clutch. The peak inertial torque at high speeds is indicated in the plot of FIG. 3, where calculated torque is shown at 118 and measured torque is shown at 120. The torques are plotted as a function of engine speed. For purposes of comparing peak combustion torque with the inertial torque, the peak combustion torque is indicated in FIG. 3 at 122.

The plot of FIG. 3 shows the importance of the strategic location of the damper in the powertrain system shown in FIG. 1. The torque capacity of the clutch need not be designed to accommodate the peak inertia torque developed by the engine because the damper is capable of attenuating the engine inertia torque at the torque input side of the clutch. The clutch then can be made smaller at reduced cost. It also may be packaged in a smaller overall engine, motor and transmission assembly.

The strategic location of the damper with respect to the clutch significantly reduces the torque loading on the clutch, which results in a much lower clutch gain (i.e., reduced clutch sensitivity to clutch pressure variations). This improves the quality of the clutch engagement.

Since both the clutch and the motor rotor are journalled at a common bearing point, the air gap between the stator and the rotor for the electric motor can be controlled with precision.

When the engine clutch is released, the motor can provide power directly to the input shaft for the transmission as the vehicle is powered solely by the motor. When the clutch is engaged, the internal combustion engine is connected to the transmission input shaft. This permits the motor to act as a starter motor to start the engine. The rotor also functions as an engine flywheel to smooth out driveline disturbances. If electric current is supplied to the stator, the electric motor can supplement the torque output of the internal combustion engine.

The friction clutch plates of the clutch 46 are lubricated and cooled by the transmission oil provided by a dedicated lubrication line for the motor. Since the stator is piloted on the transmission housing, some of the motor heat generated can be transferred to the transaxle housing by means of conductive heat transfer. Oil is returned to the transmission sump by a drain passage, not shown, in the intermediate motor housing 20. The transmission oil acts as a coolant for both the clutch and the stator.

Since the intermediate motor housing is exposed to transmission oil, it must be sealed from the engine. This is accomplished by the transmission seal 124, seen in FIG. 1. The seal 124 is held in place, adjacent to the usual crankshaft seal, by seal housing 126, which is secured, preferably by bolts, to the face 18 of the engine housing. The seal housing 126 also provides a rigid support for the housing 20 to seal against, as shown in FIG. 1.

The seal housing is provided with a vent, not shown, which provides a drain path for oil in the event that either the engine rear main seal 123 or the transmission housing seal 124 were to fail. Both of these are shown in FIG. 1.

Although a preferred embodiment of the invention has been disclosed, it will be apparent to persons skilled in the art that modifications may be made without departing from the scope of the invention. All such modifications and equivalents thereof are intended to be covered by the following claims.

What is claimed is:

1. A hybrid powertrain for an automotive vehicle comprising an internal combustion engine and a power transmission mechanism, the engine having a crankshaft and the transmission having a torque input shaft, a torque output shaft of the transmission being adapted to be connected to vehicle traction wheels;
    a friction clutch located in a torque flow path between the engine crankshaft and the transmission torque input shaft;
    a torque damper assembly in the torque flow path between the friction clutch and the crankshaft; and
    an electric motor including a rotor connected to the clutch whereby electric motor torque complements crankshaft torque as driving torque is transferred to the transmission torque output shaft;
    the clutch having a friction torque input member and a friction torque output member;
    the friction torque output member being connected to the rotor and the friction torque input member being connected to the crankshaft, the rotor thereby functioning as a flywheel mass for the crankshaft.

2. The hybrid powertrain set forth in claim 1 wherein the clutch is mounted concentrically within the rotor, the motor including a stator secured to a stationary housing portion of the powertrain and surrounding the stator and the clutch whereby the clutch and the motor are disposed between the crankshaft and the transmission torque input shaft with an economy of space, the rotor being rotatably mounted on the stationary housing portion to which the stator is secured to define a controlled air gap between the rotor and the surrounding stator.

3. The hybrid powertrain set forth in claim 1 wherein the friction torque input member is connected to one side of the torque damper assembly and the crankshaft is connected to the opposite side of the torque damper assembly, whereby torque fluctuations for the engine crankshaft are attenuated, thus reducing the peak values of torque transmitted through the clutch.

4. The hybrid powertrain as set forth in claim 3 wherein friction discs are carried by the friction torque input member and the friction torque output member;
    the friction torque output member of the clutch defining an annular clutch cylinder and an annular clutch piston in the clutch cylinder, the annular clutch cylinder and piston defining a clutch pressure actuator chamber that, when pressurized, actuates the piston into engagement with the friction discs.

5. The hybrid powertrain set forth in claim 4 including means for distributing lubrication oil from the transmission to the friction discs whereby the friction discs are cooled and lubricated with transmission oil during operation of the powertrain.

6. The hybrid powertrain set forth in claim 5 wherein the lubrication oil distributing means includes an oil return port below the clutch whereby lubrication oil transmitted to the friction discs is returned to the transmission.

7. The hybrid powertrain set forth in claim 6 including lubrication oil sealing means between the motor and the engine for isolating transmission lubrication oil from the engine.

8. The hybrid powertrain set forth in claim 7 including means for draining lubrication oil leaked past the lubrication oil sealing means thereby preventing contamination of the engine oil.

9. A hybrid powertrain for an automotive vehicle comprising an internal combustion engine and a power transmission mechanism, the engine having a crankshaft and the transmission having a torque input shaft, a torque output shaft of the transmission being adapted to be connected to vehicle traction wheels;
    a friction clutch located in a torque flow path between the engine crankshaft and the transmission torque input shaft;
    a torque damper assembly in the torque flow path between the friction clutch and the crankshaft; and
    an electric motor including a rotor connected to the clutch whereby electric motor torque complements crankshaft torque as driving torque is transferred to the transmission torque output shaft;
    the clutch being mounted concentrically within the rotor, the motor including a stator secured to a stationary housing portion of the powertrain and surrounding the stator and the clutch whereby the clutch and the motor are disposed between the crankshaft and the transmission torque input shaft with an economy of space, the rotor being rotatably mounted on the stationary housing portion to which the stator is secured to define a controlled air gap between the rotor and the surrounding stator.

10. The hybrid powertrain set forth in claim 9 including means for distributing lubrication oil from the transmission to the stator whereby the stator is cooled with transmission oil during operation of the powertrain.

* * * * *

UNITED STATES PATENT AND TRADEMARK OFFICE
CERTIFICATE OF CORRECTION

PATENT NO.   : 6,585,066 B1
DATED        : July 1, 2003
INVENTOR(S)  : Koneda et al.

It is certified that error appears in the above-identified patent and that said Letters Patent is hereby corrected as shown below:

<u>Column 6,</u>
Line 1, delete "stator" and replace with -- rotor --.
Line 56, delete "stator" and replace with -- rotor --.

Signed and Sealed this

Fifteenth Day of March, 2005

JON W. DUDAS
*Director of the United States Patent and Trademark Office*